(12) United States Patent
Inoue et al.

(10) Patent No.: US 8,409,686 B2
(45) Date of Patent: Apr. 2, 2013

(54) OPTICAL RECORDING MEDIUM AND METHOD FOR MANUFACTURING THE SAME

(75) Inventors: Hiroyasu Inoue, Tokyo (JP); Takashi Kikukawa, Tokyo (JP); Koji Mishima, Tokyo (JP); Yoshiaki Komma, Kadoma (JP); Joji Anzai, Kadoma (JP); Jun Nakano, Tokyo (JP); Manami Miyawaki, Tokyo (JP); Shigeki Takagawa, Tokyo (JP)

(73) Assignees: TDK Corporation, Tokyo (JP); Panasonic Corporation, Osaka (JP); Sony Corporation, Tokyo (JP)

( * ) Notice: Subject to any disclaimer, the term of this patent is extended or adjusted under 35 U.S.C. 154(b) by 173 days.

(21) Appl. No.: 12/882,281

(22) Filed: Sep. 15, 2010

(65) Prior Publication Data

US 2011/0076436 A1 Mar. 31, 2011

(30) Foreign Application Priority Data

Sep. 25, 2009 (JP) ................. 2009-220410

(51) Int. Cl.
  *B32B 3/02* (2006.01)
(52) U.S. Cl. .............. 428/64.1; 428/64.4; 430/270.11
(58) Field of Classification Search ............. 428/64.4; 430/270.11
See application file for complete search history.

(56) References Cited

U.S. PATENT DOCUMENTS 7,876,664 B2 * 1/2011 Tsukagoshi et al. ....... 369/275.1
8,130,628 B2 * 3/2012 Komma et al. ............. 369/283

FOREIGN PATENT DOCUMENTS

| JP | 2003317311 A | 11/2003 |
| JP | 2006209840 A | 8/2006 |
| JP | 2007012224 A | 1/2007 |
| JP | 2009032370 A | 2/2009 |
| JP | 2009037705 A | 2/2009 |

OTHER PUBLICATIONS

Ichimura et al., "Proposal for a multilayer read-only-memory optical disk structure", Applies Optics 45(8):1794-1803 (2006).
Mishima et al. "150GB, 6-layer write once disc for Blue-ray Disc System", Proc of SPIE 6282:62820I-1-11 (2006).

* cited by examiner

*Primary Examiner* — Elizabeth Mulvaney
(74) *Attorney, Agent, or Firm* — Porzio, Bromberg & Newman, P.C.

(57) ABSTRACT

An optical recording medium having three or more information recording layers reduces crosstalk caused by multi-reflected beams and improves signal quality. In the optical recording medium having three or more information recording layers, the refractive index of a plurality of intermediate layers disposed between adjacent information recording layers is greater than the refractive index of a cover layer disposed between a light incident surface and an information recording layer being the closest from the light incident surface.

12 Claims, 14 Drawing Sheets

| Refractive index | | Cover layer of normal thickness | | Cover layer of reduced thickness Intermediate layer of reduced thickness | | Cover layer of reduced thickness Intermediate layer of increased thickness | | Cover layer of increased thickness Intermediate layer of increased thickness | | Cover layer of reduced thickness Intermediate layer of reduced thickness | | Cover layer of increased thickness Intermediate layer of reduced thickness | |
|---|---|---|---|---|---|---|---|---|---|---|---|---|---|
| | | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ |
| Cover layer (k=C) $n_c=1.45$ | | 53.5 | 61.7 | 52.0 | 60.0 | 55.0 | 63.5 | 52.0 | 60.0 | 55.0 | 63.5 |
| Third intermediate layer (k=3) $n_3=1.45$ | | 11.5 | 13.3 | 10.0 | 11.5 | 13.0 | 15.0 | 13.0 | 15.0 | 10.0 | 11.5 |
| Second intermediate layer (k=2) $n_2=1.45$ | | 19.5 | 22.5 | 18.0 | 20.8 | 21.0 | 24.2 | 21.0 | 24.2 | 18.0 | 20.8 |
| First intermediate layer (k=1) $n_1=1.45$ | | 15.5 | 17.9 | 14.0 | 16.2 | 17.0 | 19.6 | 17.0 | 19.6 | 14.0 | 16.2 |
| (Verified value) | (Conditions) | (Verified value) | (NG / OK) | (Verified value) | (NG / OK) | (Verified value) | (NG / OK) | (Verified value) | (NG / OK) | (Verified value) | (NG / OK) |
| $H_2-H_1$ | $\geq 1$ | 4.6 | OK | 4.6 | OK | 4.6 | OK | 4.6 | OK | 4.6 | OK |
| $H_1-H_3$ | $\geq 1$ | 4.6 | OK | 4.6 | OK | 4.6 | OK | 4.6 | OK | 4.6 | OK |
| $H_3$ | $\geq 10$ | 13.3 | OK | 11.5 | OK | 15.0 | OK | 15.0 | OK | 11.5 | OK |
| $H_C-(H_1+H_2+H_3)$ | $\geq 1$ | 8.1 | OK | 11.5 | OK | 4.5 | OK | 1.2 | OK | 15.0 | OK |

Unit in μm

Fig. 3

| Refractive index | | Cover layer of normal thickness | | Cover layer of reduced thickness | | Cover layer of increased thickness | | Cover layer of reduced thickness / Intermediate layer of increased thickness | | Cover layer of increased thickness / Intermediate layer of reduced thickness | |
|---|---|---|---|---|---|---|---|---|---|---|---|
| | | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ |
| Cover layer (k=C) $n_c$=1.45 | | 53.5 | 61.7 | 52.0 | 60.0 | 55.0 | 63.5 | 52.0 | 60.0 | 55.0 | 63.5 |
| Third intermediate layer (k=3) $n_3$=1.7 | | 11.5 | 10.6 | 10.0 | 9.2 | 13.0 | 12.0 | 13.0 | 12.0 | 10.0 | 9.2 |
| Second intermediate layer (k=2) $n_2$=1.7 | | 19.5 | 18.0 | 18.0 | 16.6 | 21.0 | 19.3 | 21.0 | 19.3 | 18.0 | 16.6 |
| First intermediate layer (k=1) $n_1$=1.7 | | 15.5 | 14.3 | 14.0 | 12.9 | 17.0 | 15.7 | 17.0 | 15.7 | 14.0 | 12.9 |
| (Verified value) | (Conditions) | (Verified value) | (NG / OK) | (Verified value) | (NG / OK) | (Verified value) | (NG / OK) | (Verified value) | (NG / OK) | (Verified value) | (NG / OK) |
| $H_2$-$H_1$ | $\geq 1$ | 3.7 | OK | 3.7 | OK | 3.7 | OK | 3.7 | OK | 3.7 | OK |
| $H_1$-$H_3$ | $\geq 1$ | 3.7 | OK | 3.7 | NG | 3.7 | OK | 3.7 | OK | 3.7 | OK |
| $H_3$ | $\geq 10$ | 10.6 | OK | 9.2 | OK | 12.0 | OK | 12.0 | OK | 9.2 | NG |
| $H_C$-($H_1$+$H_2$+$H_3$) | $\geq 1$ | 18.9 | OK | 21.3 | OK | 16.5 | OK | 13.0 | OK | 24.8 | OK |

Unit in μm

Fig. 4

| Refractive index | Cover layer of normal thickness | | Cover layer of reduced thickness / Intermediate layer of reduced thickness | | Cover layer of increased thickness / Intermediate layer of increased thickness | | Cover layer of reduced thickness / Intermediate layer of increased thickness | | Cover layer of increased thickness / Intermediate layer of reduced thickness | |
|---|---|---|---|---|---|---|---|---|---|---|
| | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ |
| Cover layer (k=C) $n_c$=1.7 | 53.5 | 49.3 | 52.0 | 47.9 | 55.0 | 50.6 | 52.0 | 47.9 | 55.0 | 50.6 |
| Third intermediate layer (k=3) $n_3$=1.7 | 11.5 | 10.6 | 10.0 | 9.2 | 13.0 | 12.0 | 13.0 | 12.0 | 10.0 | 9.2 |
| Second intermediate layer (k=2) $n_2$=1.7 | 19.5 | 18.0 | 18.0 | 16.6 | 21.0 | 19.3 | 21.0 | 19.3 | 18.0 | 16.6 |
| First intermediate layer (k=1) $n_1$=1.7 | 15.5 | 14.3 | 14.0 | 12.9 | 17.0 | 15.7 | 17.0 | 15.7 | 14.0 | 12.9 |
| (Verified value) (Conditions) | (Verified value) | (NG / OK) | (Verified value) | (NG / OK) | (Verified value) | (NG / OK) | (Verified value) | (NG / OK) | (Verified value) | (NG / OK) |
| $H_2-H_1$  ≥1 | 3.7 | OK | 3.7 | OK | 3.7 | OK | 3.7 | OK | 3.7 | OK |
| $H_1-H_3$  ≥1 | 3.7 | OK | 3.7 | OK | 3.7 | OK | 3.7 | OK | 3.7 | OK |
| $H_3$  ≥10 | 10.6 | OK | 9.2 | NG | 12.0 | OK | 12.0 | OK | 9.2 | NG |
| $H_c-(H_1+H_2+H_3)$  ≥1 | 6.4 | OK | 9.2 | OK | 3.7 | OK | 0.9 | NG | 12.0 | OK |

Unit in μm

Fig. 5

| Refractive index | | Cover layer of normal thickness | | Cover layer of reduced thickness | | Cover layer of increased thickness | | Cover layer of reduced thickness / Intermediate layer of increased thickness | | Cover layer of increased thickness / Intermediate layer of reduced thickness | |
|---|---|---|---|---|---|---|---|---|---|---|---|
| | | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ | Physical thickness $T_k$ | Verified thickness $H_k$ |
| Cover layer (k=C) $n_c$=1.7 | | 53.5 | 49.3 | 52.0 | 47.9 | 55.0 | 50.6 | 52.0 | 47.9 | 55.0 | 50.6 |
| Third intermediate layer (k=3) $n_3$=1.45 | | 11.5 | 13.3 | 10.0 | 11.5 | 13.0 | 15.0 | 13.0 | 15.0 | 10.0 | 11.5 |
| Second intermediate layer (k=2) $n_2$=1.45 | | 19.5 | 22.5 | 18.0 | 20.8 | 21.0 | 24.2 | 21.0 | 24.2 | 18.0 | 20.8 |
| First intermediate layer (k=1) $n_1$=1.45 | | 15.5 | 17.9 | 14.0 | 16.2 | 17.0 | 19.6 | 17.0 | 19.6 | 14.0 | 16.2 |
| (Verified value) | (Conditions) | (NG / OK) | | (NG / OK) | | (NG / OK) | | (NG / OK) | | (NG / OK) | |
| $H_2-H_1$ | $\geq 1$ | 4.6 | OK | 4.6 | OK | 4.6 | OK | 4.6 | OK | 4.6 | OK |
| $H_1-H_3$ | $\geq 1$ | 4.6 | OK | 4.6 | OK | 4.6 | OK | 4.6 | OK | 4.6 | OK |
| $H_3$ | $\geq 10$ | 13.3 | OK | 11.5 | OK | 15.0 | OK | 15.0 | OK | 11.5 | OK |
| $H_C-(H_1+H_2+H_3)$ | $\geq 1$ | -4.4 | NG | -0.6 | NG | -8.2 | NG | -11.0 | NG | 2.2 | OK |

Unit in μm

Fig. 6

OPTICAL RECORDING MEDIUM AND METHOD FOR MANUFACTURING THE SAME

BACKGROUND OF THE INVENTION

1. Field of the Invention

The present invention relates to an optical recording medium having three or more information recording layers and a method for manufacturing the optical recording medium.

2. Description of the Related Art

Conventionally, optical recording media such as CD-DA, CD-ROM, CD-R, CD-RW, DVD-ROM, DVD-R, DVD+/−RW, DVD-RAM, and Blu-ray Disc (BD) have been extensively used to view digital moving image contents or to record digital data. Among these media, the BD regarded as one of the next-generation DVD standards is configured such that a laser beam of a wavelength as short as 405 nm is used for read and write operations, with the numerical aperture of the objective lens set at 0.85. The optical recording medium compatible with the BD standards has tracks formed at intervals of 0.1 to 0.5 μm. These specifications make it possible to read and write data of 25 GB or greater on one information recording layer of the optical recording medium.

As a future trend, the capacity of moving images or data is expected to grow increasingly from now on. Accordingly, intensive studies have been made on methods for increasing the capacity of the optical recording medium by providing the medium with multiple information recording layers. For the optical recording medium compatible with the BD standards, a new technique has been reported which realizes an ultrahigh capacity of 200 GB by providing six to eight information recording layers.

[Non-Patent Document 1] I. Ichimura et. al., Appl. Opt, 45, 1974-1803 (2006)

[Non-Patent Document 2] K. Mishima et. al., Proc. of SPIE, 6282 and 628201 (2006)

In general, the multi-layered optical recording medium has a problem that during read and write operations on a target information recording layer thereof, the target layer may be affected by leakage of signals or noise (crosstalk) from another information recording layer, resulting in the servo signal or recorded signal being degraded in quality.

On the other hand, as the current BD-type optical recording medium, a multi-layered optical recording medium with two information recording layers has been put into practical use. This dual-layer structure makes it possible to provide a sufficient distance between the information recording layers, thereby reducing crosstalk to the extent that no practical problems will be raised.

However, a multi-layered optical recording medium with three or more information recording layers has to be designed to include a number of information recording layers within a narrow region. Thus, when compared with the dual-layer structure, it is not possible to provide a more satisfactory spacing (interlayer distance) between adjacent information recording layers. Accordingly, the optical recording medium can be designed to cause crosstalk, degrading the quality of the servo signal or recorded signals. On the other hand, since no specific design techniques were available to avoid these problems, a very long period of time would be required to realize, by trial and error, an optical recording medium having three or more layers with good signal quality.

SUMMARY OF THE INVENTION

The present invention was developed in view of the aforementioned problems. It is therefore an object of the invention to provide a technique for reducing interlayer crosstalk in an optical recording medium with three or more layers.

Through the intensive studies of the inventors, the aforementioned object is achieved by the means below.

The invention which achieves the aforementioned object provides an optical recording medium having three or more information recording layers; a plurality of intermediate layer disposed between adjacent information recording layers and having a refractive index; and a cover layer disposed between a light incident surface and an information recording layer being the closest from the light incident surface and having a refractive index. The optical recording medium is characterized in that the refractive index of the plurality of intermediate layers is greater than the refractive index of the cover layer.

The optical recording medium according to the aforementioned invention which achieves the aforementioned object is further characterized by having the information recording layers being four or more in number and satisfying $n_1 > n_2 > n_C$, where $n_1$ is a refractive index of a first intermediate layer being the farthest from the light incident surface, $n_2$ is a refractive index of a second intermediate layer being the second farthest from the light incident surface, and $n_C$ is the refractive index of the cover layer.

The optical recording medium according to the aforementioned invention which achieves the aforementioned object is further characterized by having the information recording layers being four or more in number and satisfying $n_3 > n_1 > n_2 > n_C$, where $n_1$ is the refractive index of the first intermediate layer being the farthest from the light incident surface, $n_2$ is the refractive index of the second intermediate layer being the second farthest from the light incident surface, $n_3$ is the refractive index of the third intermediate layer being the third farthest from the light incident surface, and $n_C$ is the refractive index of the cover layer.

The optical recording medium according to the aforementioned invention which achieves the aforementioned object is preferably characterized by having the information recording layers being four in number and satisfying $T_2 - T_1 \geq 1$ μm and $T_1 - T_3 \geq 1$ μm and $T_3 \geq 10$ μm and $T_C - (T_1 + T_2 + T_3) \geq 1$ μm, where $T_1$ is a physical thickness of the first intermediate layer being the farthest from the light incident surface, $T_2$ is a physical thickness of the second intermediate layer being the second farthest from the light incident surface, $T_3$ is a physical thickness of the third intermediate layer being the third farthest from the light incident surface, and $T_C$ is a physical thickness of the cover layer.

The optical recording medium according to the aforementioned invention which achieves the aforementioned object is further characterized in that typically, the physical thickness $T_1$ of the first intermediate layer is 15.5 μm, the physical thickness $T_2$ of the second intermediate layer is 19.5 μm, the physical thickness $T_3$ of the third intermediate layer is 11.5 μm, the physical thickness $T_C$ of the cover layer is 53.5 μm, and all of the physical thicknesses are within a tolerance of 1.5 μm.

The optical recording medium according to the aforementioned invention which achieves the aforementioned object is further characterized by having the information recording layers being three in number and satisfying $n_2 > n_1 > n_C$, where $n_1$ is the refractive index of the first intermediate layer being the farthest from the light incident surface, $n_2$ is the refractive index of the second intermediate layer being the second farthest from the light incident surface, and $n_C$ is the refractive index of the cover layer.

The optical recording medium according to the aforementioned invention which achieves the aforementioned object is preferably characterized by having the information recording layers being three in number and satisfying $T_1-T_2 \geqq 1$ μm and $T_C-(T_1+T_2) \geqq 1$ μm, where $T_1$ is the physical thickness of the first intermediate layer being the farthest from the light incident surface, $T_2$ is the physical thickness of the second intermediate layer being the second farthest from the light incident surface, and $T_C$ is the physical thickness of the cover layer.

The optical recording medium according to the aforementioned invention which achieves the aforementioned object is further characterized in that typically, the physical thickness $T_1$ of the first intermediate layer is 26.5 μm, the physical thickness $T_2$ of the second intermediate layer is 15.2 μm, the physical thickness $T_C$ of the cover layer is 58.3 μm, and all of the physical thicknesses are within a tolerance of 3.0 μm.

The invention which achieves the aforementioned object provides an optical recording medium having three or more information recording layers, and intermediate layers each disposed between the adjacent ones of the information recording layers. The optical recording medium is characterized in that a verified thickness $H_k$ at a reference refractive index n is defined by the equation $H_k=T_k \times [\tan \{\arcsin(NA/n_k)\}/\tan \{\arcsin (NA/n)\}]$, where $n_k$ is a refractive index of an intermediate layer being the $k_{th}$ farthest from a light incident surface, $T_k$ is a physical thickness of that intermediate layer, $H_k$ can realize the same optical path length as that of the $k_{th}$ intermediate layer, and NA is a numerical aperture of an optical system for the optical recording medium, with the verified thicknesses $H_k$ being different from each other between the plurality of intermediate layers.

The optical recording medium according to the aforementioned invention which achieves the aforementioned object is further characterized by having the information recording layers being four in number and satisfying $H_2-H_1 \geqq 1$ μm and $H_1-H_3 \geqq 1$ μm and $H_3 \geqq 10$ μm and $H_C-(H_1+H_2+H_3) \geqq 1$ μm, where $n_1$ is a refractive index of a first intermediate layer being the farthest from the light incident surface, $T_1$ is a physical thickness thereof, and $H_1$ is a verified thickness thereof; $n_2$ is a refractive index of a second intermediate layer being the second farthest from the light incident surface, $T_2$ is a physical thickness thereof, and $H_2$ is a verified thickness thereof; $n_3$ is a refractive index of a third intermediate layer being the third farthest from the light incident surface, $T_3$ is a physical thickness thereof, and $H_3$ is a verified thickness thereof; and $n_C$ is a refractive index of a cover layer disposed between a light incident surface and an information recording layer being the closest from the light incident surface, $T_C$ is a physical thickness thereof, and $H_C$ is a verified thickness thereof. At the same time, it is preferred to satisfy $T_2-T_1 \geqq 1$ μm and $T_1-T_3 \geqq 1$ μm and $T_3 \geqq 10$ μm and $T_C-(T_1+T_2+T_3) \geqq 1$ μm.

The optical recording medium according to the aforementioned invention which achieves the aforementioned object is further characterized by having the information recording layers being three in number and satisfying $H_1-H_2 \geqq 1$ μm and $H_C-(H_1+H_2) \geqq 1$ μm, where $n_1$ is the refractive index of the first intermediate layer being the farthest from the light incident surface, $T_1$ is the physical thickness thereof, and $H_1$ is the verified thickness thereof; $n_2$ is the refractive index of the second intermediate layer being the second farthest from the light incident surface, $T_2$ is the physical thickness thereof, $H_2$ is the verified thickness thereof; and $n_C$ is the refractive index of the cover layer disposed between a light incident surface and the information recording layer being the closest from the light incident surface, $T_C$ is the physical thickness thereof, and $H_C$ is the verified thickness thereof. At the same time, it is preferred to satisfy $T_1-T_2 \geqq 1$ μm and $T_C-(T_1+T_2) \geqq 1$ μm.

The invention which achieves the aforementioned object provides a method for manufacturing an optical recording medium, the optical recording medium having three or more information recording layers. The method is characterized by calculating a verified thickness $H_k$ using the equation $H_k=T_k \times [\tan \{\arcsin(NA/n_k)\}/\tan \{\arcsin (NA/n)\}]$ at a reference refractive index n, where $n_k$ is a refractive index of an intermediate layer being the kth farthest from a light incident surface, the intermediate layer being disposed between the adjacent ones of the information recording layers, $T_k$ is a physical thickness of that intermediate layer, $H_k$ can realize the same optical path length as that of the kth intermediate layer, and NA is a numerical aperture of an optical system for the optical recording medium, and by setting the refractive index $n_k$ and the physical thickness $T_k$ for manufacturing so that the verified thicknesses $H_k$ are different from each other between the plurality of intermediate layers.

The method for manufacturing an optical recording medium according to the aforementioned invention which achieves the aforementioned object is further characterized by having the information recording layers being four in number and satisfying $H_2-H_1 \geqq 1$ μm and $H_1-H_3 \geqq 1$ μm and $H_3 \geqq 10$ μm and $H_C-(H_1+H_2+H_3) \geqq 1$ μm, where $n_1$ is a refractive index of a first intermediate layer being the farthest from the light incident surface, $T_1$ is a physical thickness thereof, and $H_1$ is a verified thickness; $n_2$ is a refractive index of a second intermediate layer being the second farthest from the light incident surface, $T_2$ is a physical thickness thereof, and $H_2$ is a verified thickness thereof; $n_3$ is a refractive index of a third intermediate layer being the third farthest from the light incident surface, $T_3$ is a physical thickness thereof, and $H_3$ is a verified thickness thereof; and $n_C$ is a refractive index of a cover layer disposed between a light incident surface and an information recording layer being the closest from the light incident surface, $T_C$ is a physical thickness, and $H_C$ is a verified thickness thereof. At the same time, it is preferred to satisfy $T_2-T_1 \geqq 1$ μm and $T_1-T_3 \geqq 1$ μm and $T_3 \geqq 10$ μm and $T_C-(T_1+T_2+T_3) \geqq 1$ μm.

The method for manufacturing an optical recording medium according to the aforementioned invention which achieves the aforementioned object is further characterized by having the information recording layers being three in number and satisfying $H_1-H_2 \geqq 1$ μm and $H_C-(H_1+H_2) \geqq 1$ μm, where $n_1$ is the refractive index of the first intermediate layer being the farthest from the light incident surface, $T_1$ is the physical thickness thereof, and $H_1$ is the verified thickness thereof; $n_2$ is the refractive index of the second intermediate layer being the second farthest from the light incident surface, $T_2$ is the physical thickness thereof, and $H_2$ is the verified thickness thereof; and $n_C$ is the refractive index of the cover layer disposed between a light incident surface and the information recording layer being the closest from the light incident surface, $T_C$ is the physical thickness thereof, and $H_C$ is the verified thickness thereof. At the same time, it is preferred to satisfy $T_1-T_2 \geqq 1$ μm and $T_C-(T_1+T_2) \geqq 1$ μm.

The present invention provides advantageous effects of reducing interlayer crosstalk of an optical recording medium having three or more information recording layers.

BRIEF DESCRIPTION OF THE DRAWINGS

FIG. 3 is a table showing first verified results for determining whether the optical recording medium has been appropriately designed;

FIG. 4 is a table showing second verified results for determining whether the optical recording medium has been appropriately designed;

FIG. 5 is a table showing third verified results for determining whether the optical recording medium has been appropriately designed;

FIG. 6 is a table showing fourth verified results for determining whether the optical recording medium has been appropriately designed;

DETAILED DESCRIPTION OF THE PREFERRED EMBODIMENTS

Describing the Principle of Occurrence of Crosstalk

First, a description will be made to the principle of occurrence of crosstalk in an optical recording medium having four information recording layers. Note that crosstalk is mainly caused by multi-reflected beams or reflections of adjacent information recording layers.

Figure 8:
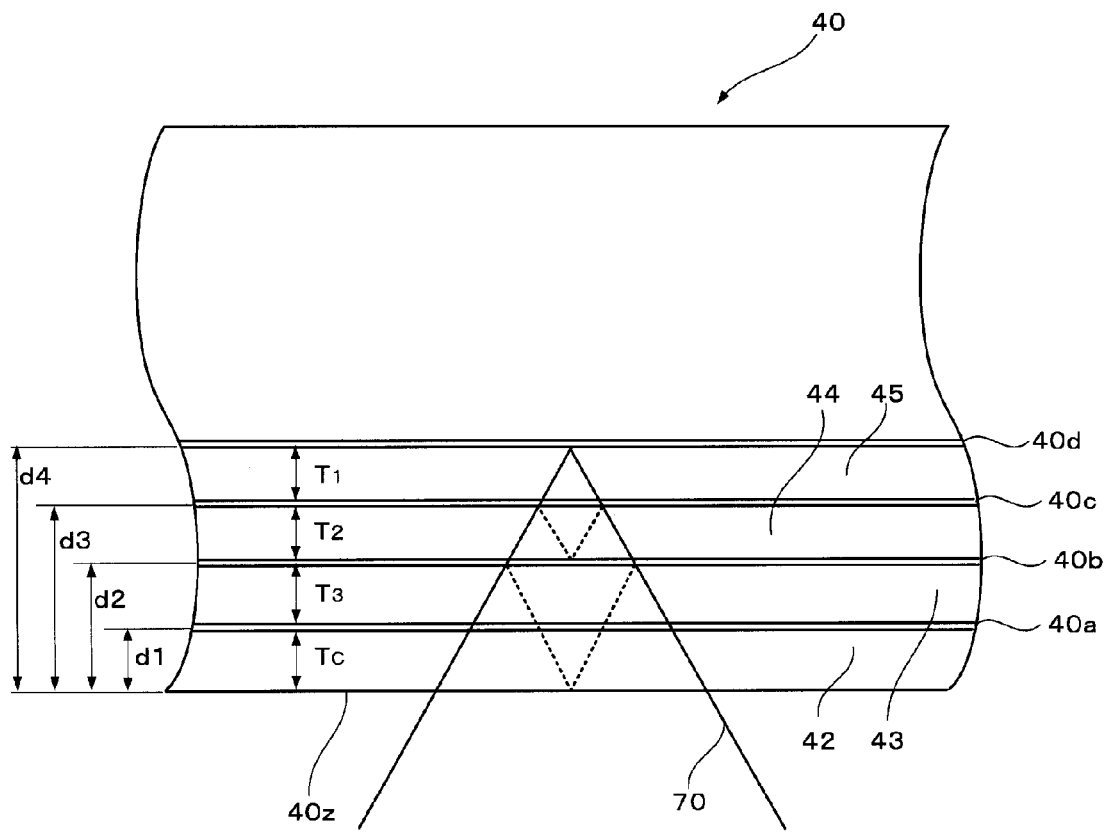
FIG. 8 is a partially enlarged view illustrating an optical recording medium to describe the principle of occurrence of crosstalk.

FIG. 8 shows a quad-layer optical recording medium 40. The optical recording medium 40 includes an L3 information recording layer 40a, an L2 information recording layer 40b, an L1 information recording layer 40c, and an L0 information recording layer 40d, in the order starting from the side of a light incident surface 40z. The optical recording medium 40 also has a cover layer 42, a third intermediate layer 43, a second intermediate layer 44, and a first intermediate layer 45. It is assumed that the thickness of the cover layer 42 (the material between the light incident surface 40z and the L3 information recording layer 40a) is $T_C$, the thickness of the third intermediate layer 43 (the material between the L3 information recording layer 40a and the L2 information recording layer 40b) is $T_3$, the thickness of the second intermediate layer 44 (the material between the L2 information recording layer 40b and the L1 information recording layer 40c) is $T_2$, and the thickness of the first intermediate layer 45 (the material between the L1 information recording layer 40c and the L0 information recording layer 40d) is $T_1$. It is also assumed that the distance from the light incident surface 40z to the L3 information recording layer 40a is d1 (approximately equal to $T_C$), the distance from the light incident surface 40z to the L2 information recording layer 40b is d2 (approximately equal to $T_C+T_3$), the distance from the light incident surface 40z to the L1 information recording layer 40c is d3 (approximately equal to $T_C+T_3+T_2$), and the distance from the light incident surface 40z to the L0 information recording layer 40d is d4 (approximately equal to $T_C+T_3+T_2+T_1$).

Figure 9:
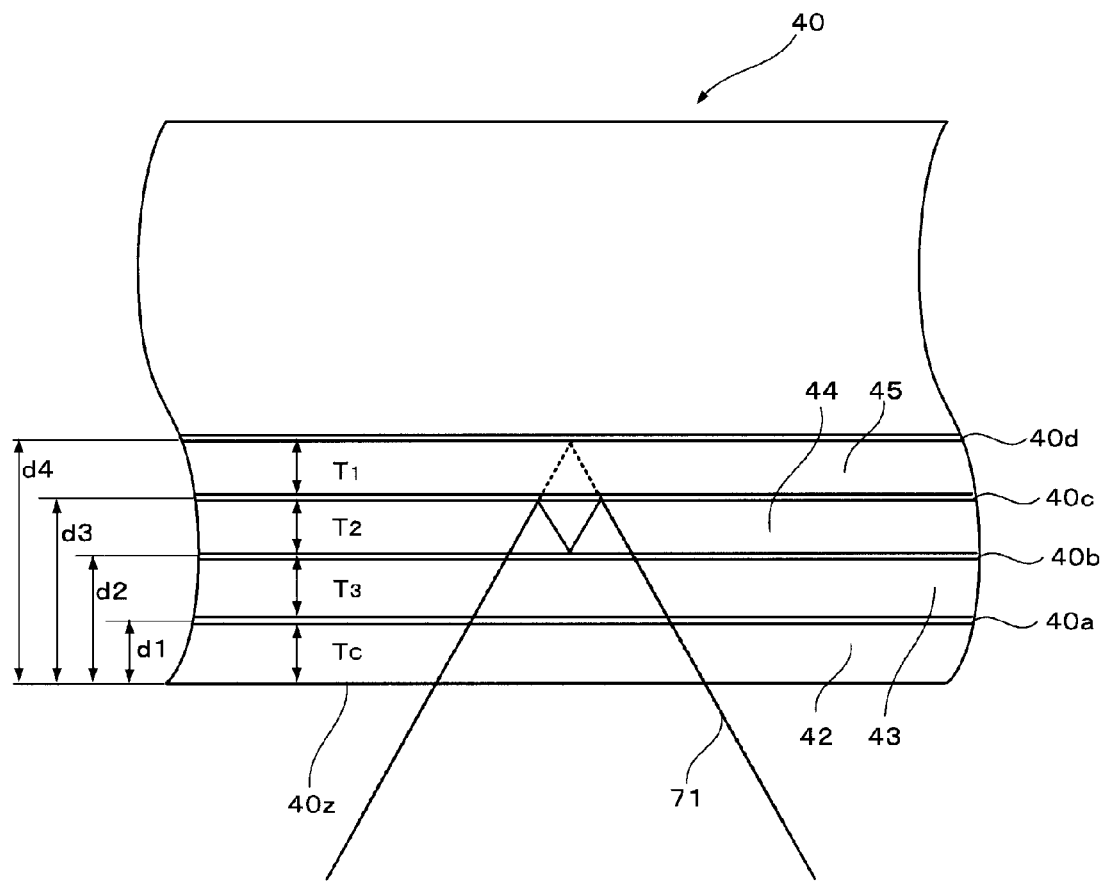
FIG. 9 is a partially enlarged view illustrating an optical recording medium to describe the principle of occurrence of crosstalk.

Now, a description will first be made to the principle of occurrence of crosstalk caused by multi-reflected beams with reference to FIGS. 8 to 11. FIG. 8 shows that a beam 70 condensed on the L0 information recording layer 40d for reading or writing thereon is split into a plurality of optical beams due to the translucency of the information recording layer. FIG. 9 shows a phenomenon that a beam 71 split from the read and write beam for the L0 information recording layer 40d is reflected on the L1 information recording layer 40c and focused on the L2 information recording layer 40b. This reflected beam is reflected again on the L1 information recording layer 40c and then detected. This phenomenon is referred to as the rear focus beam of the information recording layer.

Figure 10:
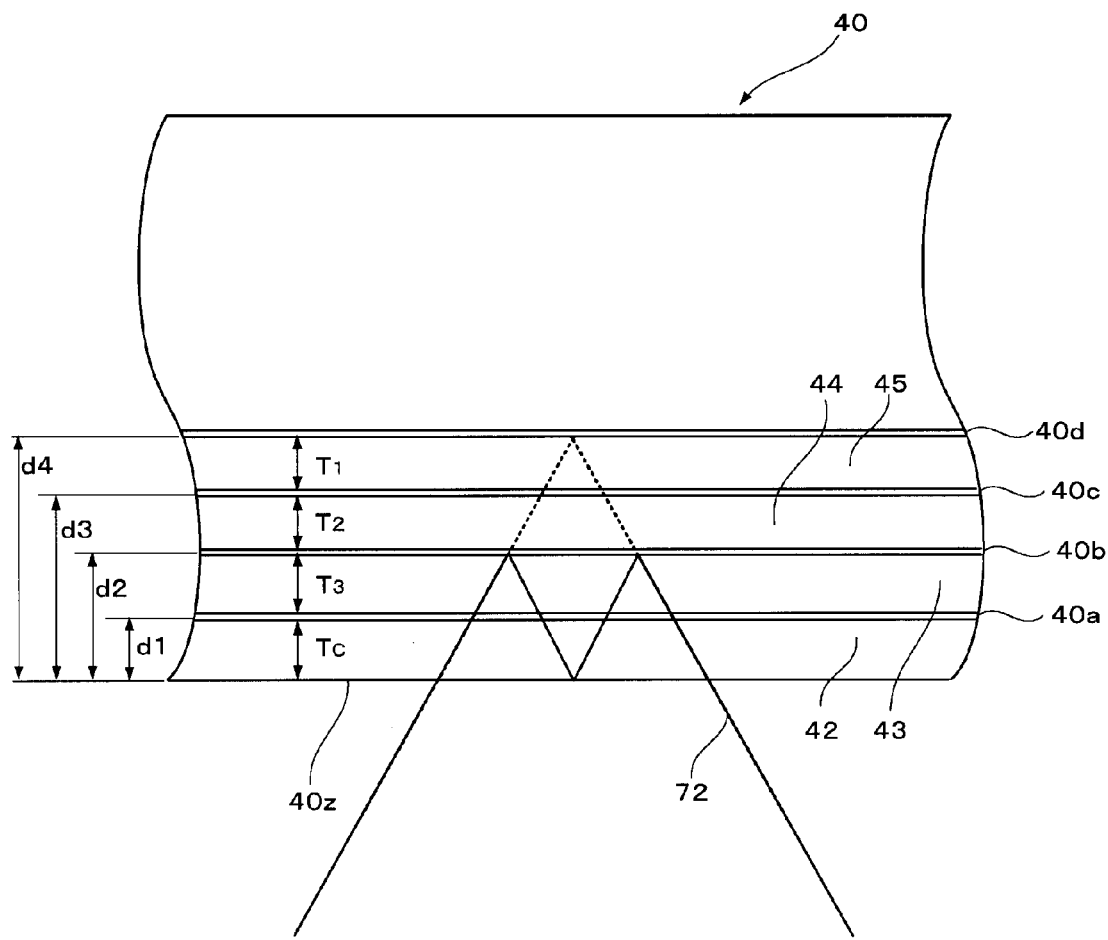
FIG. 10 is a partially enlarged view illustrating an optical recording medium to describe the principle of occurrence of crosstalk.

FIG. 10 shows a phenomenon that a beam 72 split from the read and write beam for the L0 information recording layer 40d is reflected on the L2 information recording layer 40b and focused on the light incident surface 40z. This reflected beam is reflected again on the L2 information recording layer 40b and then detected. This is referred to as the rear focus beam of the light incident surface.

Figure 11:
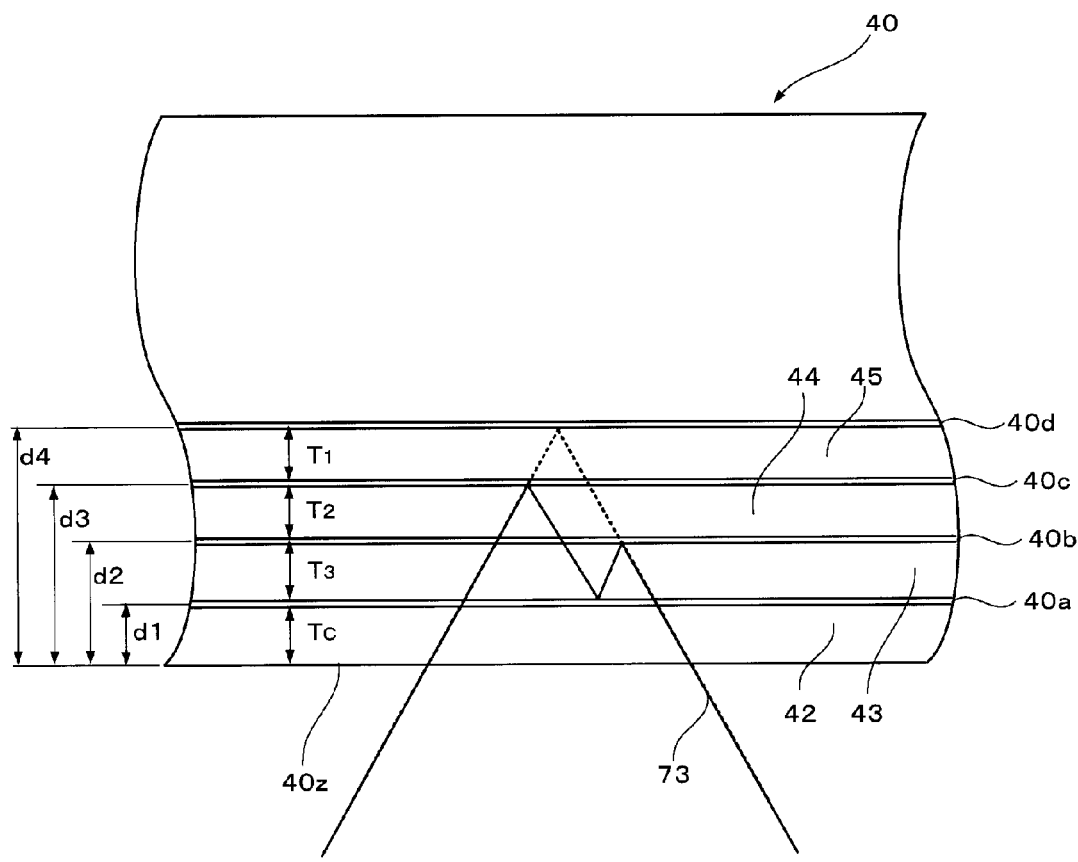
FIG. 11 is a partially enlarged view illustrating an optical recording medium to describe the principle of occurrence of crosstalk.

FIG. 11 shows a phenomenon that a beam 73 split from the read and write beam for the L0 information recording layer 40d is not focused on another information recording layer, but reflected on the L1 information recording layer 40c, the L3 information recording layer 40a, and the L2 information recording layer 40b in that order and then detected.

In the phenomena shown in FIGS. 8 to 11, for example, a setting that $T_1=T_2$ would cause the beam 70 and the beam 71 to have the same optical path length and flux diameter, and to simultaneously enter a photodetector. Likewise, a setting of $T_1+T_2=T_3+T_C$ would cause the beam 70 and the beam 72 to have the same optical path length and flux diameter, while a setting of $T_3=T_1$ would cause the beam 70 and the beam 73 to have the same optical path length and flux diameter.

When compared with the beam 70, the beams 71 to 73 or multi-reflected beams have less light intensity, but the beams having the equal optical path length and the equal flux diameter are incident on the photodetector, having serious interference effects. This causes the light intensity received by the photodetector to greatly vary due to subtle fluctuation in the interlayer thickness and thus makes it difficult to detect signals with stability. This causes crosstalk due to multi-reflected beams.

Figure 12:
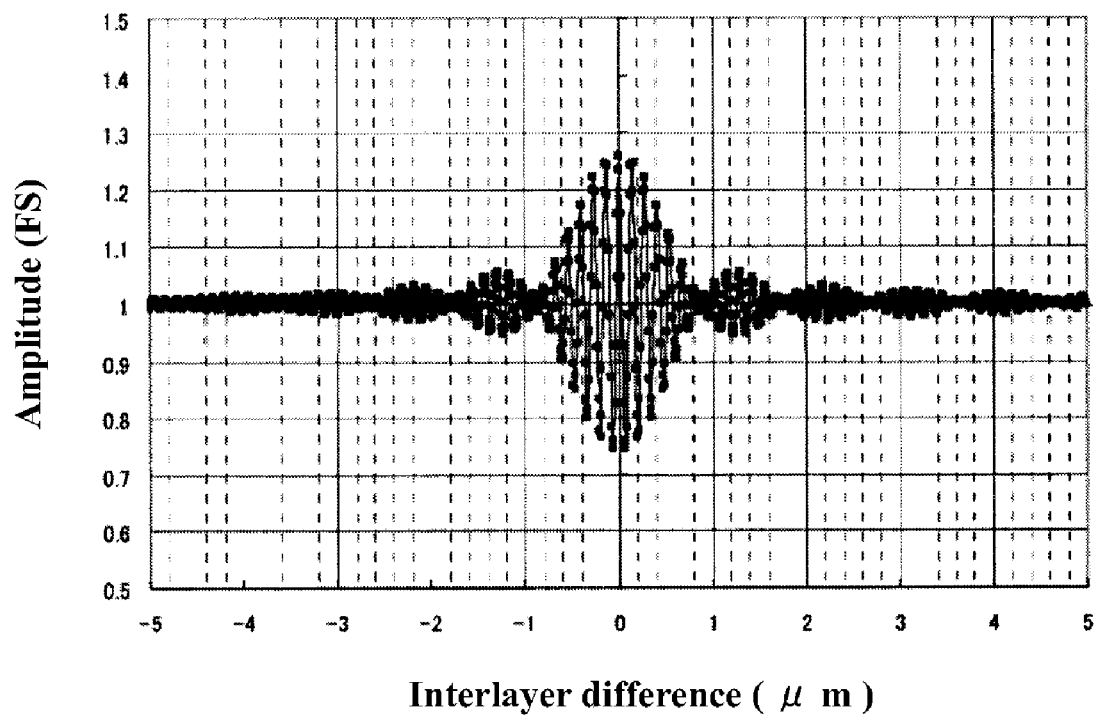
FIG. 12 is a graph showing the correlation between the interlayer difference (distance) of an optical recording medium and the FS signal amplitude to describe the principle of occurrence of crosstalk.

FIG. 12 shows variations in amplitude of an FS signal with respect to the difference in thickness between the cover layer 42 and the third intermediate layer 43 with the refractive index of both the layers 42 and 43 being 1.57, assuming that the ratio of the light intensity of the beam 70 to that of the beam 71, the beam 72, or the beam 73 is 100:1. Note that the horizontal axis represents the difference in thickness between the cover layer 42 and the third intermediate layer 43, while the vertical axis is the amplitude of the FS signal. Here, the value of only a reflected beam of the beam 70 received on the photodetector is normalized with the DC light intensity. FIG. 12 clearly shows that with the difference in interlayer thickness being 1 μm or less, the FS signal fluctuates abruptly due to the interference with the multi-reflected beam having a small light intensity ratio.

Figure 13:
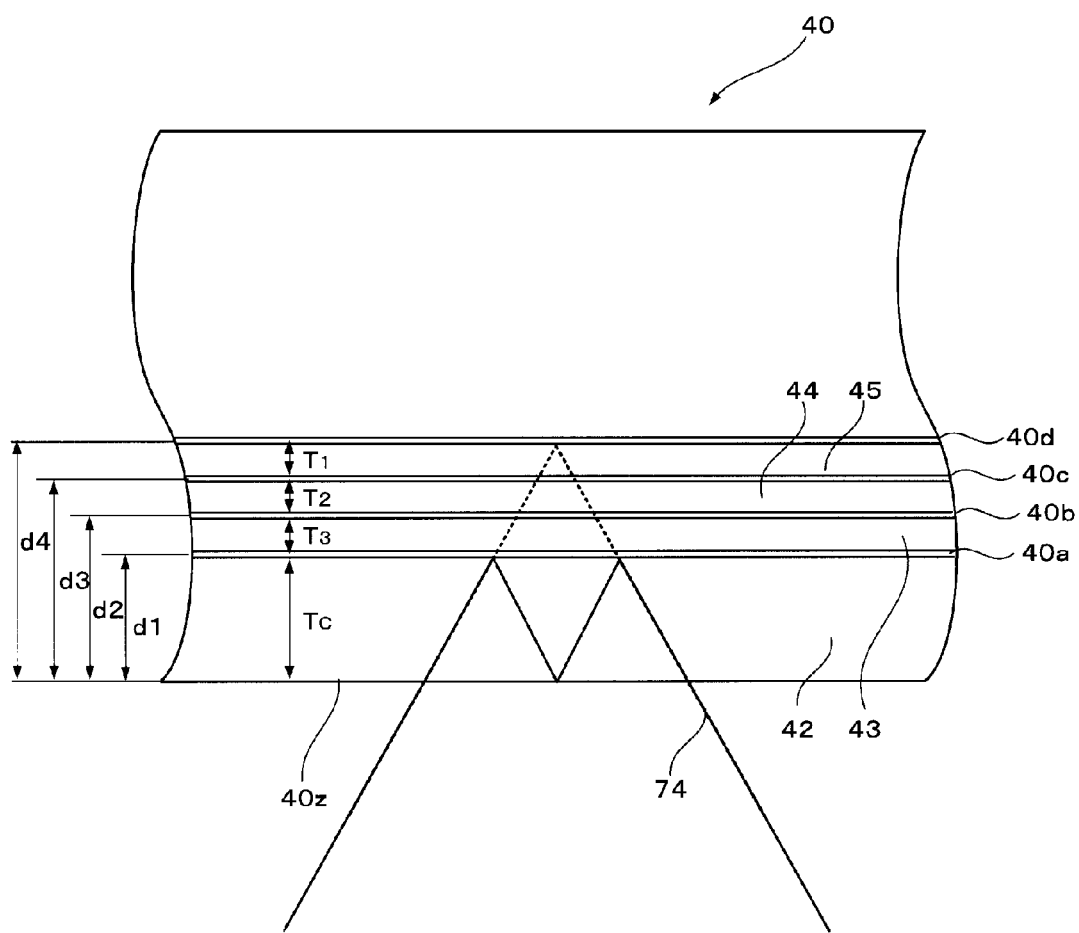
FIG. 13 is a partially enlarged view illustrating an optical recording medium to describe the principle of occurrence of crosstalk.

Note that as shown in FIG. 13, even when the difference between the thickness $T_C$ of the cover layer 42 and the total thickness $(T_3+T_2+T_1)$ of the first to third intermediate layers 43 to 45 is 1 μm or less, there occurs a problem such as variations in the FS signal due to entirely the same principle as in FIG. 10 because a split beam 74 reflects multiple times on the L3 information recording layer 40a and the light incident surface 40z.

Figure 14:
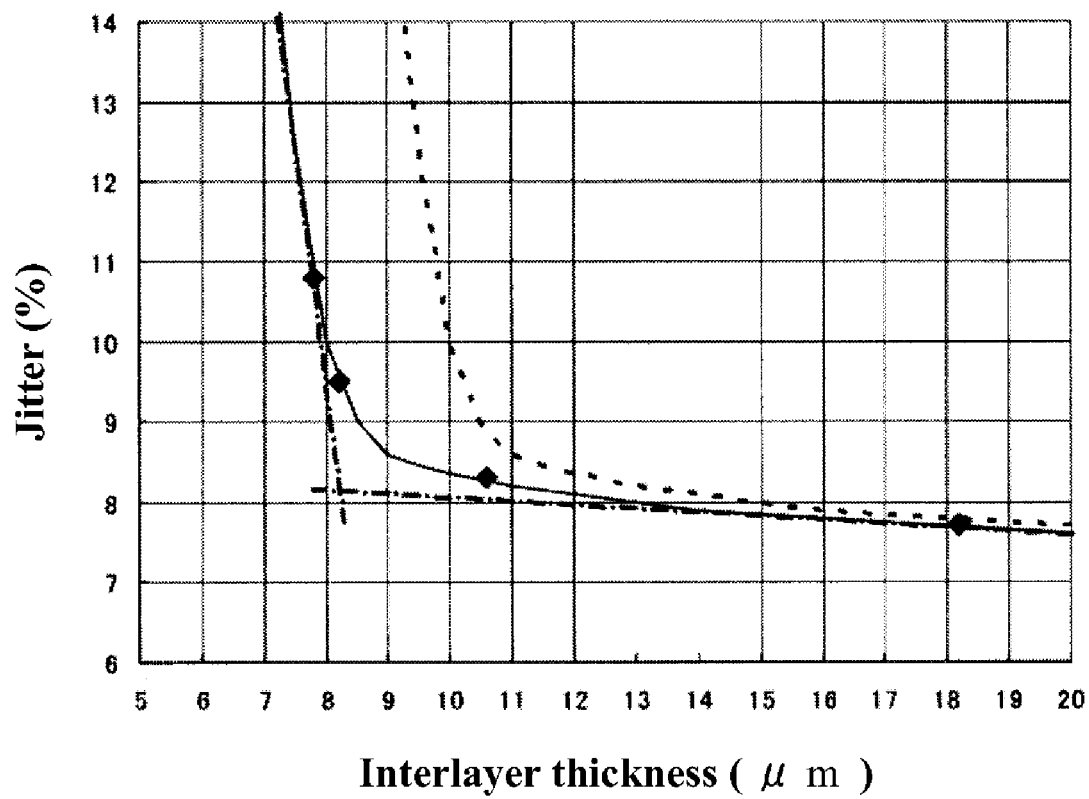
FIG. 14 is a graph showing the correlation between the interlayer thickness of an optical recording medium and the jitter to describe the principle of occurrence of crosstalk.

Now, a description will be made to crosstalk caused by the reflection of an adjacent information recording layer. The information recording layer would be subjected to crosstalk from an adjacent information recording layer when the interlayer distance is excessively short. Accordingly, the information recording layers require the interlayer distance of a predetermined value or greater. The inventors have made experiments to study the effects of the interlayer thickness on crosstalk. FIG. 14 shows the relationship between the interlayer thickness and the jitter for an optical recording medium with each information recording layer having a generally equal reflectivity. FIG. 14 shows the interlayer thickness on the horizontal axis, and the jitter on the vertical axis. The figure shows that the jitter deteriorates as the interlayer thickness is reduced and the inflection point appears at about 8 μm, where a sudden deterioration in jitter occurs at an interlayer thickness less than that point.

Note that what should be taken into account in designing or manufacturing the optical recording medium is that there may exist typically about 1.5-time difference in reflectivity of each of the information recording layers. For example, an adjacent information recording layer may have a reflectivity 1.5 times greater than that of the information recording layer on which data is to be read or written. In this case, interference may be enhanced by the square root of 1.5 in terms of the ratio of the optical amplitudes. The relationship between the jitter and the interlayer thickness, including the effects the variation in reflectivity has thereon, is as shown with the broken line in FIG. 14. As can be seen from the graph, in the actual design, the minimum value of the interlayer thickness should preferably be increased from 8 μm by 2 μm to set to 10 μm or more. This allows the stray light from another information recording layer to be detected in the photodetector and have a density of light intensity, a reflectivity of $1.5 \times (8/10)^2 = 0.96$, showing that an increase in reflection efficiency on the another information recording layer can be canceled out by an increase in the interlayer thickness. Consequently, the minimum optimum value of the interlayer thickness is 10 μm.

First Exemplary Embodiment

Now, a description will be made to an optical recording medium according to a first exemplary embodiment of the present invention and to a method for designing and manufacturing the optical recording medium. Note that as used herein, the "physical thickness" represents the actual thickness of each layer and is distinguished from the concept of the "verified thickness" which is derived by calculation as will be discussed later.

Figure 1:
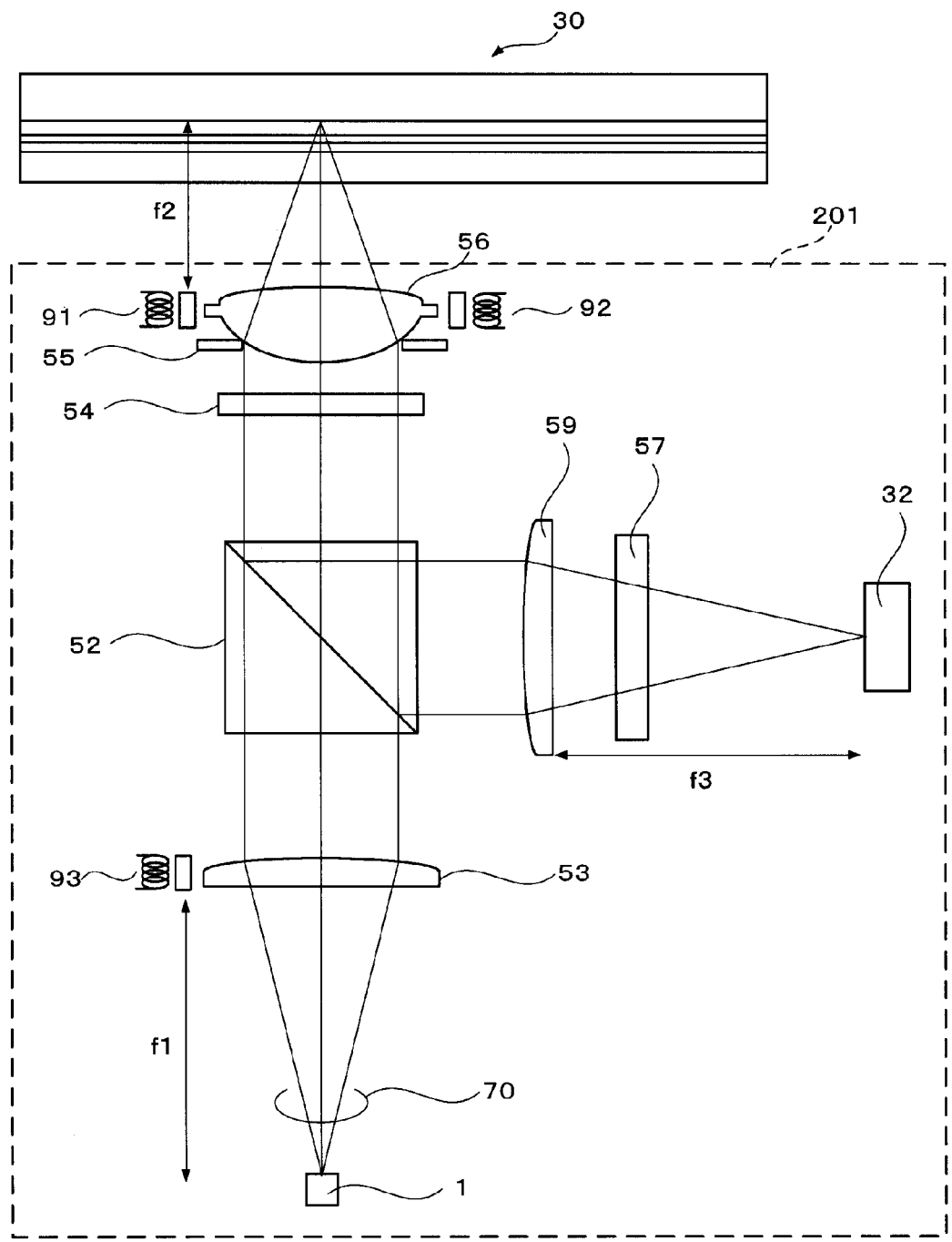
FIG. 1 is a block diagram illustrating an optical recording medium according to a first exemplary embodiment of the present invention and the structure of an optical pickup for reading and writing on the optical recording medium.

FIG. 1 shows the configuration of an optical recording medium 30 according to the present exemplary embodiment and an optical pickup 201 used for read and write operations on the medium 30. The optical pickup 201 includes a light source 1 for emitting a divergent beam 70 at a wavelength of 400 to 410 nm (405 nm here), which transmits a collimator lens 53 and then enters a polarizing beam splitter 52. The lens 53 has a focal distance f1 of 15 mm and spherical aberration correction means 93. The beam 70 having entered the polarizing beam splitter 52 transmits the polarizing beam splitter 52 and is then converted through a quarter-wave plate 54 to have a circular polarization. After that, the beam 70 is changed to a convergent beam through an objective lens 56 that has a focal distance f2 of 2 mm. The beam transmits the transparent substrate of the optical recording medium 30 and is then condensed on any one of L0 to L3 information recording layers 30d to 30a (see FIG. 2) that are formed inside the optical recording medium 30. The objective lens 56 is designed so that spherical aberration is zero at an intermediate depth between the L3 information recording layer 30a and the L0 information recording layer 30d. The spherical aberration occurring when the beam is condensed on each of the information recording layers 30a to 30d is to be eliminated by the spherical aberration correction means 93 displacing the position of the collimator lens 53 in the direction of the optical axis.

The opening of the objective lens 56 is restricted with an aperture 55, so that the numerical aperture NA is 0.80 to 0.90 (0.85 in this embodiment). For example, the beam 70 reflected on the L0 information recording layer 30d transmits the objective lens 56 and the quarter-wave plate 54 to have a linear polarization which is different by 90 degrees from the polarization during the previous travel. After that, the beam 70 is reflected on the polarizing beam splitter 52. The beam 70 reflected on the polarizing beam splitter 52 transmits a condenser 59 having a focal distance f3 of 30 mm to be converted into a convergent beam and then goes through a cylindrical lens 57 to enter a photodetector 32. The beam 70 is imparted astigmatism when transmitting the cylindrical lens 57.

The photodetector 32 has four light receiving sections (not shown), each of which outputs electric current signals according to the optical energy received. These electric-current signals are used for the astigmatism method to produce a focus error (FE) signal and for the push-pull method to create a tracking error (TE) signal, and to generate an information (RF) signal to be recorded on the optical recording medium 30. The FE signal and the TE signal are amplified to a desired level and phase-compensated, and then fed back to actuators 91 and 92 for focus and tracking control.

Figure 2:
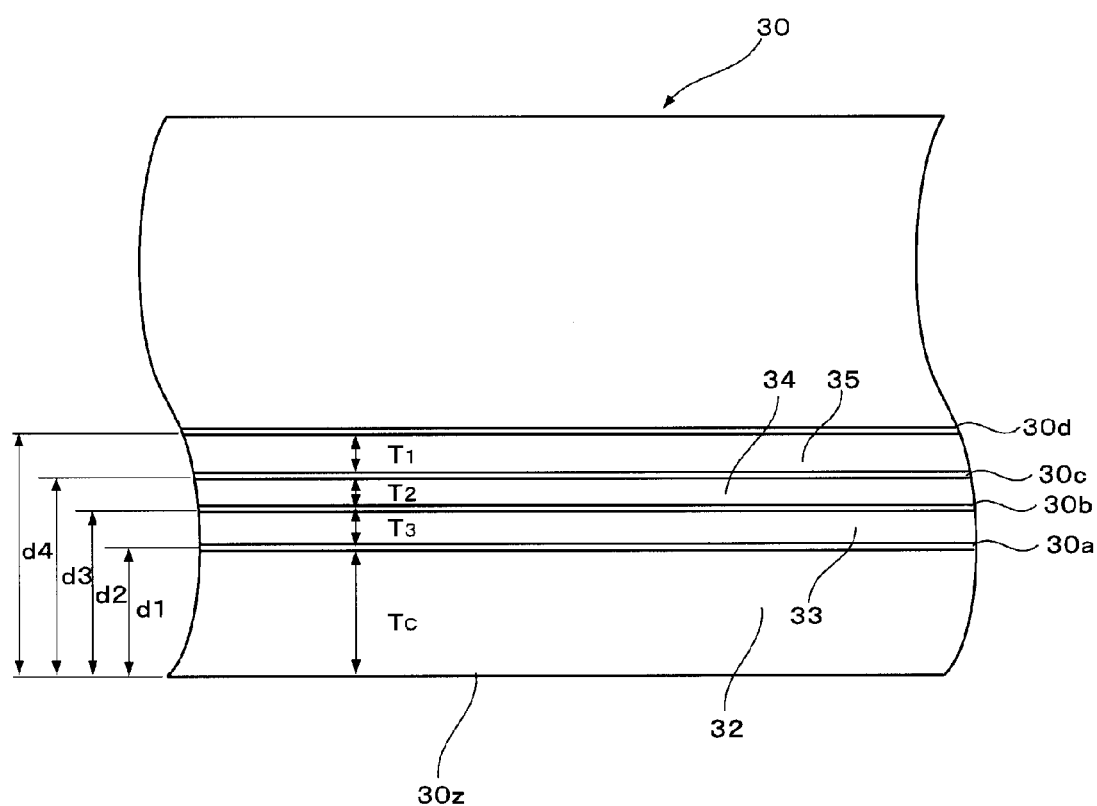
FIG. 2 is a partially enlarged view illustrating the structure of the optical recording medium.

FIG. 2 shows the structure of the optical recording medium 30. The optical recording medium 30 includes the L0 to L3 information recording layers 30d to 30a in the order from the side of a light incident surface 30z (i.e., from the side of the substrate). The medium 30 is configured such that a first intermediate layer 35 is disposed between the L0 information recording layer 30d and the L1 information recording layer 30c, a second intermediate layer 34 is disposed between the L1 information recording layer 30c and the L2 information recording layer 30b, a third intermediate layer 33 is disposed between the L2 information recording layer 30b and the L3 information recording layer 30a, and a cover layer 32 is disposed between the L3 information recording layer 30a and the light incident surface 30z.

In order to avoid adverse effects of reflected beams from another information recording layer or the surface in the optical recording medium 30, variations in physical thickness during manufacturing are taken into account to ensure at least the first to seventh thickness conditions and the refractive index conditions as described below.

<First thickness condition> To make the physical thickness $T_C$ of the cover layer 32 thicker, it is preferable that $T_C > 50$ μm. This is because the information read signal can be prevented from deteriorating in the presence of scratches or dirt on the light incident surface. The inventors' findings clearly shows that to use the optical recording medium in a bare condition without using a particular protective device such as cartridges, the physical thickness $T_C$ of the cover layer must satisfy $T_C>50$ μm, and otherwise sufficient resistance could not be obtained in the presence of foreign substances such as fingerprints on the light incident surface 30z of the medium.

<Second thickness condition> It is preferable to ensure that the difference between the physical thickness $T_C$ of the cover layer 32 and the total physical thickness $(T_3+T_2+T_1)$ of the intermediate layers 33 to 35 should be 1 μm or more. Note that the standard value of a position d4 from the light incident surface 30z of the L0 information recording layer 30d is preferably 100 μm, i.e., the same as that of the commercially available BD disc. Accordingly, when combined with the first conditions $T_C>50$ μm, the second conditions can be represented as $T_C-(T_3+T_2+T_1)\geq 1$ μm.

<Third thickness condition> It is preferable to ensure that the difference between the sum $(T_C+T_3)$ of the physical thickness $T_C$ of the cover layer 32 and the physical thickness $T_3$ of the third intermediate layer 33 and the sum $(T_2+T_1)$ of the physical thickness $T_2$ of the second intermediate layer 34 and the physical thickness $T_1$ of the first intermediate layer 35 should be 1 μm or more. Note that this condition is naturally satisfied if the first and second conditions are met.

<Fourth thickness condition> It is preferable that the difference between any two values of $T_C$, $T_3$, $T_2$, and $T_1$ is 1 μm or more.

<Fifth thickness condition> It is preferable to ensure that the minimum value of an interlayer thickness (the thickness of an intermediate layer) is 10 μm or more, as described above. That is, all of $T_3$, $T_2$, and $T_1$ should be 10 μm or more.

<Sixth thickness condition> The physical thicknesses $T_1$, $T_2$, and $T_3$ of the first to third intermediate layers 35 to 33 should be preferably configured such that $T_2>T_1>T_3$. The L2 information recording layer 30b is interposed between both the L3 information recording layer 30a and the L1 information recording layer 30c. The L1 information recording layer 30c is interposed between the L2 information recording layer 30b and the L0 information recording layer 30d. That is, both the L2 information recording layer 30b and the L1 information recording layer 30c are affected by crosstalk signals from the two adjacent layers on both the sides, and thus the effects have to be reduced.

Accordingly, first, the physical thickness of the second intermediate layer 34 $(T_2)$ is increased, thereby reducing crosstalk from another layer when the L2 information recording layer 30b or the L1 information recording layer 30c is read. As a consequence, it is preferable to provide the greatest thickness to $T_2$. It is also preferable to make both the L2 information recording layer 30b and the L1 information recording layer 30c closer to the light incident surface 30z. Since the tilt margin becomes greater as the distance between each information recording layer and the light incident surface 30z is reduced, this can be done by reducing the physical thickness $T_3$ of the third intermediate layer 33 and increasing the physical thickness $T_1$ of the first intermediate layer 35. From the above considerations, the physical thicknesses are preferably such that $T_2>T_1>T_3$.

<Seventh thickness condition> It is preferable that the L0 information recording layer 30d being the farthest from the light incident surface 30z is disposed at approximately 100 μm from the light incident surface 30z, thereby making the medium compatible with the BD that has the largest capacity among the currently commercially available optical discs. It is also preferable that by doing in this manner, sufficient system margins such as tilt margins can be advantageously ensured. This results in the physical thickness $T_C$ of the cover layer 32 being the largest among the cover layer 32 and the first to third intermediate layers 35 to 33.

Note that it can be concluded based on the aforementioned first to seventh thickness conditions that the physical thicknesses of the cover layer 32 and the first to third intermediate layers 35 to 33 should follow the relationship $T_C>T_2>T_1>T_3$.

<Specific thickness calculation> Under the aforementioned first to seventh thickness conditions, it is necessary in designing the cover layer or intermediate layer to consider a structure that can permit the maximum error and variation allowance for manufacturing. Assume that the variations in manufacturing the cover layer 32 and the intermediate layers 33 to 35 are typically within ±e (μm). With the upper and lower limit values taken into account, the median value of the physical thicknesses $T_3$ to $T_1$ of each intermediate layer that satisfies the aforementioned conditions should be such that the physical thickness $T_3$ of the third intermediate layer 33 can be set to the minimum value as $T_3=10+e$ (μm). This is because 10 μm can be ensured even in the presence of a manufacture error of—e (μm). The physical thickness $T_1$ of the first intermediate layer 35 should be $T_1=(T_3+e)+1+e=10+3e+1$(μm), when considering the error, because a thickness difference of 1 μm must be ensured with respect to $T_3$. Furthermore, the physical thickness $T_2$ of the second intermediate layer 34 should be $T_2=(T_1\ e)+1+e=10+5e+2$(μm), when considering the error, because a thickness difference of 1 μm must be ensured with respect to $T_1$.

To meet the second thickness condition, the lower limit value of the physical thickness $T_C$ of the cover layer 32 needs to be greater by 1 μm than the sum of the upper limit values of $T_1$ to $T_3$, thus $T_C-e=(T_3+T_2+T_1+3e)+1$(μm)=34+12e. As a result, it holds that $T_C=34+13e$.

From the seventh thickness condition, the total physical thickness of the cover layer 32 and the first to third intermediate layers 35 to 33 is 100 μm, i.e., $T_C+T_3+T_2+T_1=67+22e=100$(μm), resulting in the tolerance $e=33/22=1.5$ (μm).

From the above discussions, the standard values for the physical thicknesses of the cover layer 32 and the first to third intermediate layers 35 to 33 are such that $T_C=53.5$ (μm), $T_3=11.5$ (μm), $T_2=19.5$ (μm), and $T_1=15.5$ (μm). Note that in terms of the distance from the light incident surface 30z, d1=$T_C$=53.5 d2=$T_C+T_3$=65.0 (μm), d3=d2+$T_2$=84.5 (μm), and d4=100 (μm). These standard values for the physical thicknesses can have a manufacturing tolerance of ±1.5

Note that the first to seventh thickness conditions are inevitably satisfied if the manufacturing variations in the cover layer and each of the intermediate layers 33 to 35 fall within ±e (μm). In other words, the tolerance "e" is a necessary condition to meet the first to seventh conditions. Note that even with the physical thickness $T_C$ of the cover layer 32 having an error greater than "e", the first to seventh conditions may be satisfied if the physical thickness of another intermediate layer is close to the reference value. Note that to obtain a good focus error signal quality in the focusing motion, the distance from the light incident surface to each information recording layer must fall within the aforementioned error.

<Refractive index conditions> Now, a description will be made to the refractive index conditions. For the optical recording medium 30, the optical path lengths of the cover layer 32, the third intermediate layer 33, the second intermediate layer 34, and the first intermediate layer 35 are defined as $L_C$, $L_3$, $L_2$, and $L_1$, respectively. The aforementioned crosstalk caused by multi-reflected beams would appear when L=(i, j=1, 2, 3, and C, and i≠j) and when the sum of the optical path lengths of any combinations of $L_C$, $L_3$, $L_2$, and $L_1$ is equal to the sum of the optical path lengths of the other combinations thereof (for example, $L_1+L_2=L_3+L_C$). As described in regard to the seventh thickness condition, the BD is specified to have an optical path length of 100 μm from the light incident surface 30z of the optical recording medium 30 to the farthest L0 information recording layer 30d. However, this optical path length is defined to coincide with the physical thickness when all the cover layer 32 and the intermediate layers 33 to 35 have a refractive index of 1.6. This means that the physical thickness and the optical path length are different from each other if all the layers have a refractive index other than 1.6.

Now, the first intermediate layer 35, the second intermediate layer 34, the third intermediate layer 33, and the cover layer 32, which are each indexed with "k" (k=1, 2, 3, C) in the order from the side of the substrate, are defined to have a refractive index $n_k$, a physical thickness $T_k$, and an optical path length $L_k$. A detailed discussion will be made below to examine under what conditions these optical path lengths $L_k$ become equivalent to the optical path length $L_{1.6}$ of a virtual layer that has a refractive index of 1.6 and a physical thickness $T_{1.6}$.

First, a case will be discussed in which the equal optical path lengths would lead to crosstalk caused by multi-reflected beams. Equation 1 below (Snell's Law) holds when a beam of light is incident upon media of refractive indices $n_1$ and $n_2$ at incident angles of $\theta_1$ and $\theta_2$, respectively.

$$n_1 \times \sin \theta_1 = n_2 \times \sin \theta_2 (=NA=0.85 \text{ for the } BD) \quad \text{(Equation 1)}$$

On the other hand, suppose that a light beam enters one medium of a refractive index $n_1$ and a physical thickness $T_1$ at an angle of $\theta_1$ and the other medium of a refractive index $n_2$ and a physical thickness $T_2$ at angle of $\theta_2$. A comparison between the media for geometric considerations shows that their optical path lengths coincide with each other when Equation 2 below holds.

$$T_1 \times \tan \theta_1 = T_2 \times \tan \theta_2 \quad \text{(Equation 2)}$$

As a result, the conditions that the optical path length $L_k$ of the cover layer 32 and the intermediate layers 33 to 35, having a refractive index $n_k$ and a physical thickness $T_k$, coincide with the optical path length $L_{1.6}$ of a cover layer and intermediate layers, having a refractive index 1.6 and a physical thickness $T_{1.6}$, will be given by Equation 3 below.

$$T_{1.6} \times \tan \theta_{1.6} = T_k \times \tan \theta_{nk} \quad \text{(Equation 3)}$$

Since Snell's Law teaches that $\theta_{nk}$=arcsin (NA/$n_k$) and $\theta_{1.6}$=arcsin (NA/1.6), the equation above can be replaced by Equation 4 below.

$$T_{1.6}(H_k) = T_k \times [\tan \{\arcsin(NA/n_k)\}/\tan \{\arcsin(NA/1.6)\}] \quad \text{(Equation 4)}$$

This means that Equation 4 above under the condition of all the layers having the same optical path length can be used to convert the cover layer and the intermediate layers of a refractive index $n_k$ and a physical thickness $T_k$ into those of a refractive index 1.6 and a thickness $T_{1.6}$ (which is referred to as "the verified thickness $H_k$ with a reference refractive index being set at 1.6).

Essentially, crosstalk caused by multi-reflected beams occurs when the optical path lengths coincide with each other in consideration of changes in refractive index. Accordingly, to positively verify this fact, it is crucial that the actual refractive index $n_k$ and physical thickness $T_k$ of each of the cover layer and the intermediate layers are used to obtain the verified thickness $H_k$ with a reference refractive index 1.6, so that the verified thickness $H_k$ satisfies the aforementioned first to seventh thickness conditions in addition to the physical thickness. That is, use is made of the verified thickness $H_k$ to design the cover layer and the intermediate layers so that the layers will not have the same thickness.

Note that Equation 4 above tells that a refractive index $n_k$ greater than the reference refractive index (1.6) results in the verified thickness $H_k$ being less than the physical thickness $T_k$. On the other hand, it is also shown that the refractive index $n_k$ less than 1.6 leads to the verified thickness $H_k$ being greater than the physical thickness $T_k$. The second thickness condition is based on the relationship that $T_C > T_3 + T_2 + T_1$. Thus, setting the refractive index $n_C$ of the cover layer to be less than the refractive indices $n_1$ to $n_3$ of all the intermediate layers allows the second thickness condition to be satisfied more readily.

Furthermore, as concluded above, the aforementioned first to seventh thickness conditions define the physical thickness of the cover layer 32 and the first to third intermediate layers 35 to 33 with the relationship that $T_C > T_2 > T_1 > T_3$. Accordingly, to stick to this relationship without exception, the refractive index of the cover layer 32 and the first to third intermediate layers 35 to 33 is preferably set to the relationship that $n_3 > n_1 > n_2 > n_C$, which is opposite to that for the physical thickness.

Note that if the third intermediate layer 33 is given a refractive index $n_3$ greater than 1.6, the verified thickness $H_3$ is less than the physical thickness $T_3$. Accordingly, it is also preferable to re-define the actual physical thickness $T_3$ so that the verified thickness $H_3$ is 10+e (μm).

First Verification Example

An optical recording medium 30 was verified which had the cover layer 32 and the third to first intermediate layers 33 to 35 of a refractive index of 1.45 with $T_C$=53.5 (μm), $T_3$=11.5 (μm), $T_2$=19.5 (μm), and $T_1$=15.5 (μm). It was assumed that all the thicknesses were allowed to have a ±1.5 μm variation as a manufacture tolerance "e". Note that during manufacturing, the third to first intermediate layers 33 to 35 were continuously deposited and thus all expected to have variations in thickness in the same direction (all towards the plus or minus side). Accordingly, the following five situations were assumed: (1) all having the typical thickness, (2) all the cover layer 32 and the third to first intermediate layers 33 to 35 being thinner (−1.5 μm), (3) all the cover layer 32 and the third to first intermediate layers 33 to 35 being thicker (+1.5 μm), (4) the cover layer 32 being thinner (−1.5 μm) and the third to first intermediate layers 33 to 35 being thicker (+1.5 μm), and (5) the cover layer 32 being thicker (+1.5 μm) and the third to first intermediate layers 33 to 35 being thinner (−1.5 μm). Furthermore, in the first verification example, the thickness of each of the cover layer 32 and the third to first intermediate layers 33 to 35 was converted into the verified thickness $H_k$ when the layers had a reference refractive index of 1.6. The thickness conditions were verified by checking whether the four conditions in total were satisfied, i.e., if the conditions for avoiding crosstalk caused by multi-reflected beams, $H_2 - H_1 \geq 1$ μm, $H_1 - H_3 \geq 1$ μm, and $H_C - (H_1 + H_2 + H_3) \geq 1$ μm, and the condition for avoiding adjacent interlayer crosstalk, $H_3 \geq 10$ μm were met. The results are shown in FIG. 3.

As can be seen from FIG. 3, the first verification example satisfies the four conditions even when the variations in thickness within the tolerance are taken into account. It is also shown that since the refractive index 1.45 less than the reference refractive index 1.6 causes the verified thickness $H_k$ to be greater than the physical thickness $T_k$, the minimum thickness or 10 μm that allows for avoiding crosstalk between adjacent layers satisfies the verified thickness $H_k$.

Second Verification Example

A verification was conducted on the case where the physical thicknesses were entirely the same as those of the first verification example, with the cover layer 32 having a refractive index of 1.45 and the third to first intermediate layers 33 to 35 having a refractive index of 1.7. The verification was made entirely in the same manner as for the first verification example. The results are shown in FIG. 4. In this case, it can be seen that the condition $H_3 \geq 10$ μm was not satisfied, so that such conditions as for avoiding crosstalk between adjacent layers might not be met. However, it can be seen that those conditions for avoiding crosstalk caused by multi-reflected beams are all met. Accordingly, it can be seen that the refractive index of the intermediate layers is preferably made greater than the refractive index of the cover layer 32 in order to avoid crosstalk caused by multi-reflected beams. Note that to avoid interlayer crosstalk, at least the refractive index $n_3$ of the third intermediate layer 33 can be preferably reduced within the range greater than the refractive index $n_C$ of the cover layer 32.

Third Verification Example

A verification was performed on the case where the physical thicknesses were entirely the same as those of the first verification example, with the cover layer 32 and the third to first intermediate layers 33 to 35 having a refractive index of 1.7. The verification was made entirely in the same manner as for the first verification example. The results are shown in FIG. 5. In this case, it can be seen that the condition $H_3 \geq 10$ μm was not satisfied, so that such conditions as for avoiding crosstalk between adjacent layers might not be met. It can also be seen that those conditions for avoiding crosstalk caused by multi-reflected beams, i.e., $H_C - (H_1 + H_2 + H_3) \geq 1$ μm might not be met. Accordingly, it can be seen that crosstalk caused by multi-reflected beams or crosstalk between adjacent layers may not possibly be avoided even when the cover layer 32 and the intermediate layers have the same refractive index, for example, if both the layers have a reference refractive index greater than 1.6. Accordingly, it is preferable that the refractive index of the cover layer 32 is less than 1.6, and at least the refractive index $n_3$ of the third intermediate layer 33 is reduced within a range greater than the refractive index $n_C$ of the cover layer 32.

Fourth Verification Example

A verification was performed on the case where the physical thicknesses were entirely the same as those of the first verification example, with the cover layer 32 having a refractive index of 1.7 and the third to first intermediate layers 33 to 35 having a refractive index of 1.45. The verification was made entirely in the same manner as for the first verification example. The results are shown in FIG. 6. In this case, $H_3 \geq 10$ μm can be satisfied and thus the conditions for avoiding crosstalk between adjacent layers are met. However, in many cases, the conditions for avoiding crosstalk caused by multi-reflected beams, i.e., $H_C - (H_1 + H_2 + H_3) \geq 1$ μm cannot be satisfied. Accordingly, it can be seen that if the refractive index of the intermediate layers is less than the refractive index of the cover layer 32, then crosstalk caused by multi-reflected beams cannot be avoided.

Second Exemplary Embodiment

Now, a description will be briefly made to an optical recording medium with three information recording layers according to a second exemplary embodiment of the present invention. This optical recording medium has a substrate, an L0 information recording layer, a first intermediate layer, an L1 information recording layer, a second intermediate layer, an L2 information recording layer, a cover layer, and a light incident surface, in that order. This optical recording medium requires the thickness conditions that are mentioned below.

<First thickness condition> It preferably holds that $T_C > 50$ μm to make the physical thickness $T_C$ of the cover layer thick.

<Second thickness condition> It is preferable to ensure that the difference between the physical thickness $T_C$ of the cover layer and the total sum $(T_2 + T_1)$ of the physical thicknesses of the first and second intermediate layers is 1 μm or more. Note that the standard value of the position of the L0 information recording layer from the light incident surface is preferably the same as that of the commercially available BD disc, i.e., 100 μm. Accordingly, in combination with the first condition, $T_C > 50$ μm, the second condition can be expresses as $T_C - (T_2 + T_1) \geq 1$ θm.

<Third thickness condition> The difference between any two values of $T_C$, $T_2$, and $T_1$ is preferably 1 μm or more.

<Fourth thickness condition> It is preferable to ensure that the minimum value of an interlayer thickness (the thickness of an intermediate layer) is 10 μm or more. That is, both $T_2$ and $T_1$ should be 10 μm or more.

<Fifth thickness condition> The tilt margin increases as the distance between an information recording layer and the light incident surface is reduced. Accordingly, it is preferable that the thickness $T_2$ of the second intermediate layer is reduced and the thickness $T_1$ of the first intermediate layer is increased. That is, $T_1 > T_2$. As a result, it should hold that $T_C > T_1 > T_2$.

<Sixth thickness condition> It is preferable that the L0 information recording layer being the farthest from the light incident surface is located approximately 100 μm from the light incident surface, thereby making the medium compatible with the BD that has the largest capacity among the currently commercially available optical discs.

<Calculation of Specific Thickness>

Assuming that all the cover layer and the intermediate layers have ±e (μm) variations in physical thickness, the median value of the physical thicknesses $T_C$, $T_2$, and $T_1$ of the cover layer and the intermediate layers that satisfy the aforementioned conditions can be calculated as follows. The physical thickness $T_2$ of the second intermediate layer is $T_2 = 10 + e$ (μm). The physical thickness $T_1$ of the first intermediate layer is $T_1 = (T_2 + e) + 1 + e = 10 + 3e + 1$ (μm). From the second thickness condition, the lower limit value of the thickness $T_C$ of the cover layer needs to be greater by 1 μm than the sum of the upper limit values of $T_1$ to $T_2$, thus $T_C - e = (T_1 + T_2 + 2e) + 1$ (μm) $= 22 + 6e$. As a result, $T_C = 22 + 7e$. Since the total of $T_C$ to $T_2$ is 100 μm from the sixth thickness condition, it holds that $T_C + T_2 + T_1 = 43 + 11e = 100$ (μm), resulting in the tolerance "e" is equal to 57/11, which is approximately equal to 5.2 (μm).

Consequently, the standard value of the physical thicknesses of the cover layer, the second intermediate layer, and the first intermediate layer is as $T_C = 58.3$ (μm), $T_2 = 15.2$ (μm), and $T_1 = 26.5$ (μm).

The dual-layer BD disc, which has already been commercially available, has an intermediate layer of a thickness of about 25 μm between the information recording layers. Thus, the triple-layer optical recording medium should be designed such that the L1 information recording layer is located at the same position as that of the dual-layer structure BD disc, in order to readily cooperate with the player or the recorder. Furthermore, the physical thickness $T_1$ of the first intermediate layer has variations (tolerance) of ±3 μm, which is just enough to manufacture the disc with ease. In this context, it is preferable to employ not $T_2$=26.5±5.2 μm but $T_1$=25±3 μm, which is within the range of the former. With this as a precondition, to obtain a good read signal with reduced interlayer crosstalk, the physical thickness $T_2$ of the second intermediate layer is increased as large as $T_2$=18±3 μm. It is also preferable that the physical thickness $T_C$ of the cover layer should be $T_C$=100−($T_3$+$T_2$)=57(μm). As a result, it is preferably satisfied that $T_C$ is 52 to 62 μm, $T_2$ is 15 to 21 μm, and $T_1$ is 22 to 28 μm. Here, the physical thickness $T_C$ of the cover layer is greater than an intermediate layer and preferably provided with a greater tolerance, and thus has a tolerance of ±5 μm.

Note that the aforementioned calculation assumes that the refractive index of the cover layer and the first and second intermediate layers is a reference refractive index of 1.6. Accordingly, as discussed above, if the refractive index is not 1.6, a re-verification will be made so that the physical thickness $T_k$ is converted into the verified thickness $H_k$ to satisfy the aforementioned thickness conditions. Even in this case, as with the first exemplary embodiment, the refractive index $n_C$ of the cover layer also needs to be reduced as compared with all the refractive indices $n_1$ to $n_3$ of the intermediate layers. This is because such a situation as easily satisfying the condition, $H_C$>$H_1$+$H_2$, can be obtained. Furthermore, to stick to the order in $H_C$>$H_1$>$H_2$, it is preferable to set the refractive index $n_C$ of the cover layer, the refractive index $n_2$ of the second intermediate layer, and the refractive index $n_1$ of the first intermediate layer to $n_2$>$n_1$>$n_C$ as opposing to that order.

Note that the exemplary embodiments illustrated above employed only the reference refractive index of 1.6 to obtain converted verified thicknesses; however, the present invention is not limited thereto but may also employ other numerical values. Furthermore, the exemplary embodiments illustrated above employed the optical recording medium 30 only with three or four information recording layers; however, the layers may also be five or more.

Figure 7:
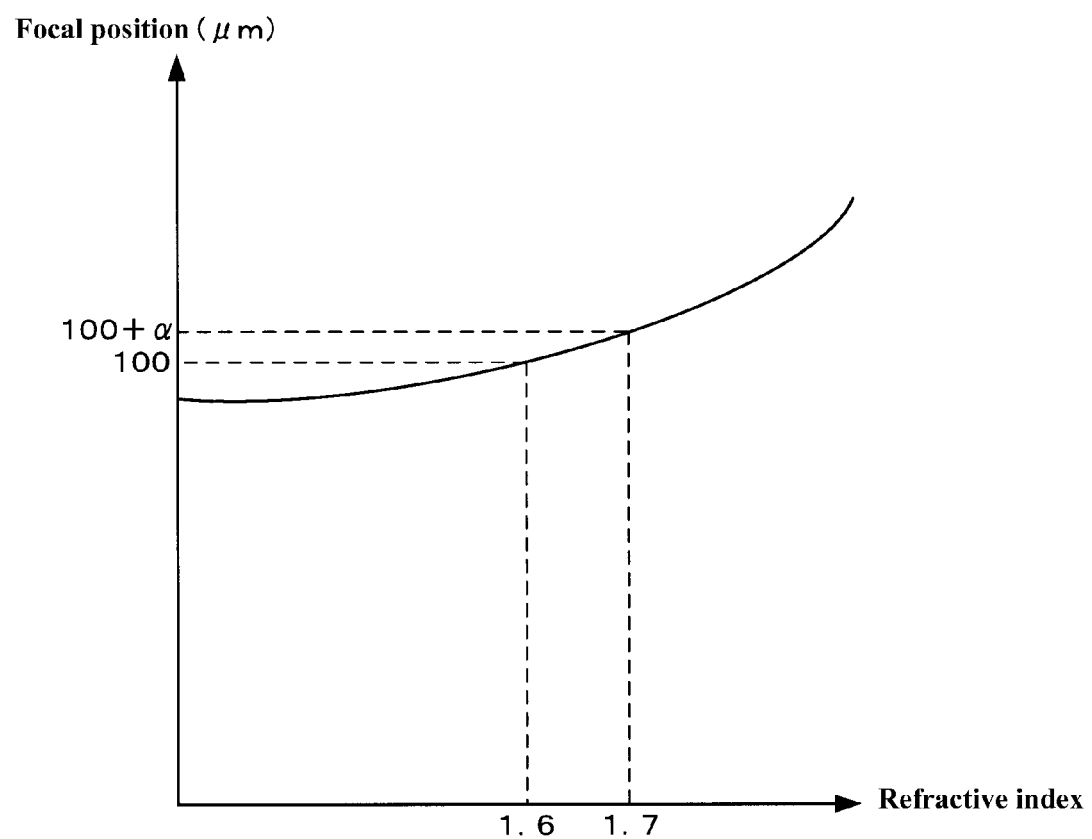
FIG. 7 is a view of a conversion graph between the refractive index and the focal position to provide constant compensation for spherical aberration.

Furthermore, in the aforementioned exemplary embodiments, such a case has been shown in which the thickness of the cover layer and the intermediate layers is set by taking into account changes in optical path length due to variations in refractive index. In addition to changes in optical path length, an additional condition that the spherical aberration correction is kept constant may also be preferably employed. Specifically, the objective lens 56 of the optical pickup 201 shown in FIG. 1 is designed to have zero spherical aberration at an intermediate depth between the L3 information recording layer 30a and the L0 information recording layer 30d. The spherical aberration occurring when beams are condensed on each of the information recording layers 30a to 30d is compensated for by the spherical aberration correction means 93 displacing the position of the collimator lens 53 in the direction of the optical axis. On the precondition that the optical recording medium has a refractive index of 1.6, the amount of correction is uniquely determined by software applications incorporated in the optical pickup 201. Accordingly, since the optical path length is different from the expected one when the cover layer or an intermediate layer does not have a refractive index of 1.6, beams will focus on a different position than the expected focal position. Thus, it can happen that there exists no information recording layer at the focused position. In this context, for example, a conversion graph between the refractive index and the focal position as shown in FIG. 7 may be used to locate an information recording layer at a position that can be expected by the result of the conversion. Specifically, in the aforementioned exemplary embodiments, it is assumed that for the refractive index of 1.6, the L0 information recording layer is located 100 μm from the light incident surface. However, when the cover layer and an intermediate layer have a refractive index of 1.7, which is greater than 1.6, the graph of FIG. 7 is used to locate the L0 information recording layer at 100+α (μm), which corresponds to that refractive index. Note that when the cover layer or an intermediate layer has a refractive index less than 1.6, the L0 information recording layer is located at a position corresponding to the refractive index, for example, at a position less than 100 (μm). This allows for placing the information recording layer at the actual focal position even when the software application incorporated in the optical pickup 201 uniquely corrects for spherical aberration on the assumption that the refractive index is 1.6. Accordingly, when considering the first exemplary embodiment, it is preferable that with the refractive index being 1.7, specific thicknesses should be calculated using the condition, $T_C$+$T_3$+$T_2$+$T_1$=100±α, to find specific values.

It is to be understood that the present invention is not limited to the aforementioned exemplary embodiments and that various changes and modifications may be made in the invention without departing from the spirit and scope thereof.

The present invention is applicable to three or more layers optical recording media to reduce crosstalk.

The entire disclosure of Japanese Patent Application No. 2009-220410 filed on Sep. 25, 2009 including specification, claims, drawings, and summary are incorporated herein by reference in its entirety.

What is claimed is:

1. An optical recording medium comprising:
   three or more information recording layers;
   a plurality of intermediate layer disposed between adjacent information recording layers and having a refractive index;
   a cover layer disposed between a light incident surface and an information recording layer being the closest from the light incident surface and having a refractive index, wherein the refractive index of the plurality of intermediate layers is greater than the refractive index of the cover layer;
   a verified thickness $H_k$ at a reference refractive index n is defined by the equation $H_k=T_k\times[\tan\{\arcsin(NA/n_k)\}/\tan\{\arcsin(NA/n)\}]$, where $n_k$ is a refractive index of an intermediate layer being the $k_{th}$ farthest from a light incident surface, $T_k$ is a physical thickness of that intermediate layer, $H_k$ can realize the same optical path length as that of the $k_{th}$ intermediate layer, and NA is a numerical aperture of an optical system for the optical recording medium;
   a verified thickness $H_c$ at a reference refractive index n is defined by the equation $H_c=T_c\times[\tan\{\arcsin(NA/n_c)\}/\tan\{\arcsin(NA/n)\}]$, where $n_c$ is a refractive index of the cover layer, $T_c$ is a physical thickness of that cover layer, $H_c$ can realize the same optical path length as that of the cover layer, and NA is a numerical aperture of an optical system for the optical recording medium; and
   the verified thickness of $H_c$ of the cover layer is larger than the total verified thickness $\Sigma H_k$ of all intermediate layers.

2. The optical recording medium according to claim 1, comprising the information recording layers being four or more in number and satisfying $n_1$>$n_2$>$n_C$, where $n_1$ is a refractive index of a first intermediate layer being the farthest from the light incident surface, $n_2$ is a refractive index of a second intermediate layer being the second farthest from the light incident surface, and is the refractive index of the cover layer.

3. The optical recording medium according to claim 1, comprising the information recording layers being four or more in number and satisfying $n_3 > n_1 > n_2 > n_C$, where $n_1$ is the refractive index of the first intermediate layer being the farthest from the light incident surface, $n_2$ is the refractive index of the second intermediate layer being the second farthest from the light incident surface, $n_3$ is a refractive index of a third intermediate layer being the third farthest from the light incident surface, and $n_C$ is the refractive index of the cover layer.

4. The optical recording medium according to claim 3, wherein
a physical thickness $T_1$ of the first intermediate layer is typically 15.5 μm,
a physical thickness $T_2$ of the second intermediate layer is typically 19.5 μm,
a physical thickness $T_3$ of the third intermediate layer is typically 11.5 μm,
a physical thickness $T_C$ of the cover layer is typically 53.5 μm, and
all of the physical thicknesses are within a tolerance of 1.5 μm.

5. The optical recording medium according to claim 1, comprising the information recording layers being three in number and satisfying $n_2 > n_1 > n_C$, where $n_1$ is a refractive index of a first intermediate layer being the farthest from the light incident surface, $n_2$ is a refractive index of a second intermediate layer being the second farthest from the light incident surface, and $n_C$ is the refractive index of the cover layer.

6. The optical recording medium according to claim 5, wherein
a physical thickness $T_1$ of the first intermediate layer is typically 26.5 μm,
a physical thickness $T_2$ of the second intermediate layer is typically 15.2 μm,
a physical thickness $T_C$ of the cover layer is typically 58.3 μm, and
all of the physical thicknesses are within a tolerance of 3.0 μm.

7. An optical recording medium according to claim 1, wherein
the verified thicknesses $H_k$ are different from each other between the plurality of intermediate layers.

8. The optical recording medium according to claim 7, comprising the information recording layers being four in number, and
satisfying $H_2 - H_1 \geq 1$ μm and $H_1 - H_3 \geq 1$ μm and $H_3 \geq 10$ μm and $H_C - (H_1 + H_2 + H_3) \geq 1$ μm, where
$n_1$ is a refractive index of a first intermediate layer being the farthest from the light incident surface, $T_1$ is a physical thickness thereof, and $H_1$ is a verified thickness thereof;
$n_2$ is a refractive index of a second intermediate layer being the second farthest from the light incident surface, $T_2$ is a physical thickness thereof, and $H_2$ is a verified thickness thereof; and
$n_3$ is a refractive index of a third intermediate layer being the third farthest from the light incident surface, $T_3$ is a physical thickness thereof, and $H_3$ is a verified thickness thereof.

9. The optical recording medium according to claim 7, comprising the information recording layers being three in number and satisfying $H_1 - H_2 \geq 1$ μm and $H_C - (H_1 + H_2) \geq 1$ μm, where
$n_1$ is a refractive index of a first intermediate layer being the farthest from the light incident surface, $T_1$ is a physical thickness thereof, and $H_1$ is a verified thickness thereof; and
$n_2$ is a refractive index of a second intermediate layer being the second farthest from the light incident surface, $T_2$ is a physical thickness thereof, $H_2$ is a verified thickness thereof.

10. A method for manufacturing an optical recording medium, the optical recording medium having three or more information recording layers, the method comprising:
calculating a verified thickness $H_k$ using the equation $H_k = T_k \times [\tan\{\arcsin(NA/n_k)\}/\tan\{\arcsin(NA/n)\}]$ at a reference refractive index n, where $n_k$ is a refractive index of an intermediate layer being the kth farthest from a light incident surface, the intermediate layer being disposed between the adjacent ones of the information recording layers, $T_k$ is a physical thickness of that intermediate layer, $H_k$ can realize the same optical path length as that of the kth intermediate layer, and NA is a numerical aperture of an optical system for the optical recording medium
calculating a verified thickness $H_c$ using the equation $H_c = T_c \times [\tan\{\arcsin(NA/n_c)\}/\tan\{\arcsin(NA/n)\}]$ at a reference refractive index n, where $n_c$ is a refractive index of a cover layer, the cover layer being disposed between the light incident surface and the information recording later being the closest from the light incident surface, $T_c$ is a physical thickness of that cover layer, $H_c$ can realize the same optical path length as that of the cover layer, and NA is a numerical aperture of an optical system for the optical recording medium, and
setting the refractive index $n_k$, $n_c$ and the physical thickness $T_k$, $T_c$ for manufacturing so that the verified thickness $H_c$ of the cover layer is larger than the total verified thickness $\Sigma Hk$ of all intermediate layers.

11. The method for manufacturing an optical recording medium according to claim 10, wherein
the optical recording medium has the information recording layers being four in number, and
$H_2 - H_1 \geq 1$ μm and $H_1 - H_3 \geq 1$ μm and $H_3 \geq 10$ μm and $H_C - (H_1 + H_2 + H_3) \geq 1$ μm are satisfied, where
$n_1$ is a refractive index of a first intermediate layer being the farthest from the light incident surface, $T_1$ is a physical thickness thereof, and $H_1$ is a verified thickness;
$n_2$ is a refractive index of a second intermediate layer being the second farthest from the light incident surface, $T_2$ is a physical thickness thereof, and $H_2$ is a verified thickness thereof;
$n_3$ is a refractive index of a third intermediate layer being the third farthest from the light incident surface, $T_3$ is a physical thickness thereof, and $H_3$ is a verified thickness thereof.

12. The method for manufacturing an optical recording medium according to claim 10, wherein
the optical recording medium has the information recording layers being three in number, and
$H_1 - H_2 \geq 1$ μm and $H_C - (H_1 + H_2) \geq 1$ μm, where
$n_1$ is a refractive index of a first intermediate layer being the farthest from the light incident surface, $T_1$ is a physical thickness thereof, and $H_1$ is a verified thickness thereof;
$n_2$ is a refractive index of a second intermediate layer being the second farthest from the light incident surface, $T_2$ is a physical thickness thereof, and $H_2$ is a verified thickness thereof.

* * * * *